F. W. & E. T. ALBERTINE.
GUIDE FOR CARDING MACHINES.
No. 66,112. Patented June 25, 1867.
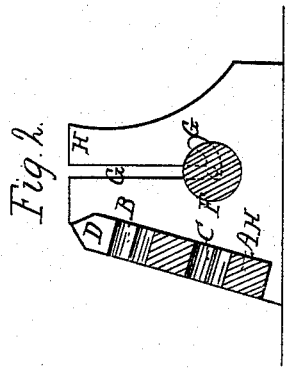
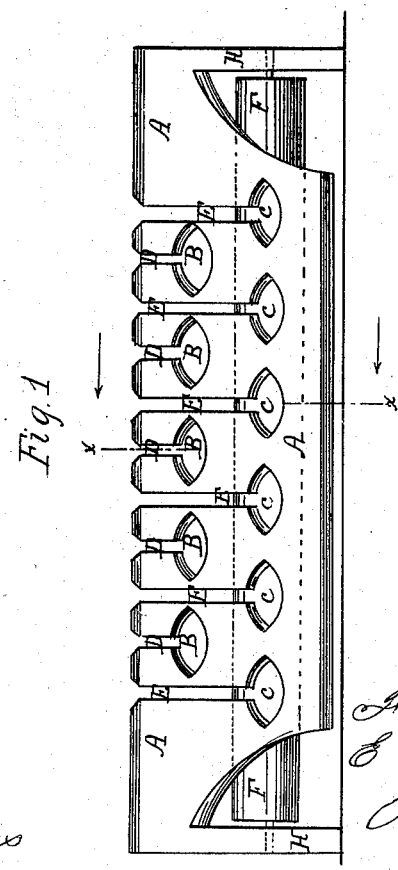
Witnesses
Inventors

United States Patent Office.

F. W. ALBERTINE AND E. T. ALBERTINE, OF HANOVER, CONNECTICUT.

Letters Patent No. 66,112, dated June 25, 1867.

---

IMPROVEMENT IN GUIDES FOR CARDING MACHINES.

---

The Schedule referred to in these Letters Patent and making part of the same.

---

TO ALL WHOM IT MAY CONCERN:

Be it known that we, F. W. ALBERTINE and E. T. ALBERTINE, of Hanover, in the county of New London, and State of Connecticut, have invented a new and improved Guide for Carding Machines; and we do hereby declare that the following is a full, clear, and exact description thereof, which will enable others skilled in the art to make and use the same, reference being had to the accompanying drawings, forming part of this specification, in which—

Figure 1 is a side view of our improved carding-machine guide.

Figure 2 is a vertical cross-section of the same, taken through the line x x, fig. 1.

Similar letters of reference indicate like parts.

Our invention has for its object to furnish an improved guide for carding machines, by the use of which the carding will necessarily be done all over the cylinder, so that the tumbler, cylinder, and fancy will be worn evenly and not in creases, rendering it unnecessary to grind so often, wearing the card clothing evenly, and doing better work; and it consists in the perforated and slotted plate, and in the combination of a roller therewith, the whole being constructed and arranged as hereinafter more fully described.

A is the plate, the ends of which are attached to suitable supports H in a slightly inclined position. Through this plate A are formed two rows of holes, B and C, elongated laterally, or made oval in form, as shown in fig. 1. The holes B of the upper row are placed over the spaces between the holes C of the lower row, and the said holes are made of such a length that the ends of each upper hole B may overlap the ends of the two contiguous holes C in the lower row over the space between which the said hole is placed. From the middle part of each of the holes B and C to the upper edge of the plate A are formed slots D and E of exactly the same breadth; and the upper edge of the plate A, upon each side of each of the slots D and E, is bevelled off, as shown in fig. 1. F is a roller, the journals of which enter and work in slots G formed in the end-pieces or supports H for the ends of the plate A. The slots G are vertical from the upper edges of the supports H to about the level of the lower row of holes C, from which point they curve upward, as shown in fig. 2, so that roller F may be readily inserted and removed, and will be held securely in place while at work. In using the guide it is placed with the roller F towards the slivers to be carded. The roller F is first removed, and the lower laps of the slivers are passed down through the slots E into the lower holes C, and the upper laps are passed down through the slots D into the holes B. The roller F is then adjusted with its journals in the slots G, and is pushed and drawn down until its said journals enter the curved parts of said slots, and the machine is ready for operation.

By means of this device the slivers, instead of being carded upon a limited part of the cylinder, will be spread over its whole surface, doing better work, and preventing the tumbler, cylinder, and fancy from being worn in creases, and the consequent frequent grinding.

What we claim as new, and desire to secure by Letters Patent, is—

1. The guide-plate A, perforated and slotted substantially in the manner herein shown and described and for the purpose set forth.

2. The combination of the roller F with the guide-plate A, substantially as herein shown and described and for the purpose set forth.

F. W. ALBERTINE,
E. T. ALBERTINE.

Witnesses:
NORMAN SMITH,
L. J. SAXTON.